(12) United States Patent
Badano

(10) Patent No.: US 6,207,078 B1
(45) Date of Patent: Mar. 27, 2001

(54) PROCESS FOR THE PRODUCTION OF SYNTHESIS GAS

(75) Inventor: Marco Badano, Lugano-Besso (CH)

(73) Assignee: Ammonia Casale SA, Lugano-Besso (CH)

( * ) Notice: Subject to any disclaimer, the term of this patent is extended or adjusted under 35 U.S.C. 154(b) by 0 days.

(21) Appl. No.: 09/428,658

(22) Filed: Sep. 24, 1999

(30) Foreign Application Priority Data

Nov. 3, 1998 (EP) .................................................. 98203695

(51) Int. Cl.[7] ............................. C07C 1/02; C07C 27/00; C01C 1/04

(52) U.S. Cl. ......................... 252/373; 518/703; 518/704; 423/359

(58) Field of Search ................................. 518/704, 703; 252/373; 423/359

(56) References Cited

FOREIGN PATENT DOCUMENTS

| 0 440 258 | 8/1991 | (EP) . |
|---|---|---|
| 0 522 744 | 1/1993 | (EP) . |
| 33 45 064 | 6/1985 | (FR) . |
| 1 327 639 | 8/1973 | (GB) . |
| 2 160 516 | 12/1985 | (GB) . |

*Primary Examiner*—Johann Richter
*Assistant Examiner*—J. Parsa
(74) *Attorney, Agent, or Firm*—Sughrue, Mion, Zinn, Macpeak & Seas, PLLC

(57) ABSTRACT

A process for the production of synthesis gas for obtaining compounds such as ammonia or methanol, in which hydrocarbons and steam are reacted first in a primary reforming section (11) and then—together with oxygen—in a secondary reforming section (12), thus obtaining CO, $CO_2$, $H_2$ and possibly $N_2$ which are then fed to a carbon monoxide conversion section (13, 14), is distinguished by the fact of reacting hydrocarbons, steam and oxygen in an autothermal reforming section (20) provided in parallel with respect to other reforming sections (11, 12), and feeding the so produced CO, $CO_2$, $H_2$ and possibly $N_2$ to the carbon monoxide conversion section (13, 14).

5 Claims, 1 Drawing Sheet

PROCESS FOR THE PRODUCTION OF SYNTHESIS GAS

DESCRIPTION

1. Field of Application

The present invention relates to a process for the production of synthesis gas for obtaining compounds such as ammonia and methanol.

More specifically, the invention relates to a process for the production of synthesis gas comprising the steps of:

feeding a first flow comprising hydrocarbons and a first gas flow comprising steam to a primary reforming section;

feeding a first gas flow comprising oxygen and possibly nitrogen to a secondary reforming section;

reacting the hydrocarbons and steam first in the primary reforming section and then—together with oxygen—in the secondary reforming section, obtaining a first gas phase comprising CO, $CO_2$, $H_2$ and possibly $N_2$;

feeding the first gas phase comprising CO, $CO_2$, $H_2$ and possibly $N_2$ to a carbon monoxide conversion section.

Throughout this specification and the appended claims, the term: "hydrocarbons" is used to indicate generically a raw material source of hydrogen and carbon, such as for example methane, natural gas, naphtha, GPL, (liquefied petroleum gas) or refinery gas and mixtures thereof.

The invention relates also to a plant for the production of synthesis gas for implementing the aforesaid process, as well as to a method of retrofitting an existing plant for the production of synthesis gas.

As known, in the field of synthesis gas production, more and more the need is felt of realizing processes which are easy to implement and allow to reach higher and higher production capacities with low operating and investment costs and low energy consumption.

2. Prior Art

In order to satisfy such requirements, synthesis gas production processes, in which a flow comprising hydrocarbons and a gas flow comprising steam are sent first to a primary reforming section and then—together with a gas flow comprising oxygen and possibly nitrogen—to a secondary reforming section, have found broad application. A gas phase rich in CO, $CO_2$, $H_2$ and possibly $N_2$ is thereby obtained, which is in turn sent to treatment sections such as for example the carbon monoxide conversion sections at high and low temperature. The treatment sections can vary depending on the type of synthesis gas to be produced.

In order to improve the conversion yield of hydrocarbons, as well as to reduce the energy consumption, processes for the production of synthesis gas are used in the field wherein the conversion reaction in the secondary reforming section is carried out in the presence of a catalyst.

The secondary reformers intended for carrying out such processes are generally called autothermal, since they do not require external heat supply for their operation.

Although advantageous in some aspects, the above described processes exhibit a series of drawbacks. First of all the fact of being little flexible and not able to adapt themselves effectively to variations in the operating conditions, in particular when significant increases in the amount of synthesis gas to be produced are required.

In fact, the primary and secondary reforming sections, responsible for the conversion of hydrocarbons, are not able to operate conveniently apart from the design capacity.

Therefore, in order to adapt the synthesis gas producing plants which operate according to the above described processes to the capacity increases required more and more in this field, dramatic interventions of retrofitting and, last but not least, the replacement of the reforming sections themselves with sections having increased capacity are necessary, with very high investment costs.

Further on, it is important to notice that the presence of a primary reforming section requires a supply from outside of high amounts of heat that affects negatively the overall energy consumption necessary for implementing such processes.

Because of these drawbacks, the implementation of synthesis gas producing processes according to the prior art requires today high investments and energy consumption, such to penalize remarkably the costs of base chemicals such as hydrogen and carbon monoxide, despite the ever increasing demand for these products.

SUMMARY OF THE INVENTION

The problem underlying the present invention is to provide a process for the production of synthesis gas which is easy to implement and allows to obtain high production capacities with low operating and investment costs as well as with low energy consumption.

The above problem is solved, according to the invention, by a process for the production of synthesis gas of the aforesaid type, which is characterized in that it comprises the steps of:

feeding a second flow comprising hydrocarbons, a second gas flow comprising steam and a second gas flow comprising oxygen and possibly nitrogen to an autothermal reforming section provided in parallel with respect to the primary and secondary reforming sections;

reacting the hydrocarbons, steam and oxygen in the autothermal reforming section, obtaining a second gas phase comprising CO, $CO_2$, $H_2$ and possibly $N_2$;

feeding the second gas phase comprising CO, $CO_2$, $H_2$ and possibly $N_2$ to the carbon monoxide conversion section.

Throughout this specification and the appended claims, the term: "autothermal reforming section" is used to indicate a reforming section wherein hydrocarbons, steam and oxygen are reacted, preferably in the presence of catalyst, without heat being supplied from outside. In the production of synthesis gas for ammonia or methanol, sections of this kind are generally called secondary reforming sections.

Advantageously, thanks to the step wherein a second flow of hydrocarbons is reacted in an autothermal reforming section, it is possible to face easily and effectively even substantial capacity variations of the plant implementing the process according to the invention.

In fact, according to the present invention, the reforming reaction of hydrocarbons is carried out in two stages, provided in parallel, the former comprising a primary reforming section and a secondary reforming section, the latter comprising an autothermal reforming section.

In this way, it is possible to apportion the desired total production of synthesis gas in the two reforming stages, whose capacity may be therefore varied from time to time and independently according to the specific demand, without negatively affecting the remaining process.

In particular, the load partition in the reforming sections arranged in parallel, allows—inter alia—to optimize the energy consumption, maximizing the production of synthesis gas in the autothermal reforming section and at the same time minimizing the feed to the primary reformer.

In other words, the production capacity of synthesis gas being equal, the present process permits to suitably apportion in two reforming stages arranged in parallel the hydrocarbons and the steam. Therefore the overall energy consumption is lower than that needed by the prior art.

Advantageously, the gas flows comprising CO, $CO_2$, $H_2$ and possibly $N_2$ obtained respectively in the secondary reforming section and in the autothermal reforming section, are sent to a same carbon monoxide conversion section, exploiting in this way only one equipment line in order to carry out the subsequent steps of preparation for the synthesis gas.

A further advantage, resulting from the process according to the invention, is given by the fact that, having the possibility of feeding separate flows of hydrocarbons to reforming stages independent from each other, it is advantageously possible to use for the production of synthesis gas hydrocarbons of different nature in the different reforming stages, thus adapting the process to the existing natural resources and to whichever requirement may arise.

In order to obtain a synthesis gas for the production of ammonia with a high $CO_2/H_2$ molar ratio, the second gas flow comprising oxygen fed to the autothermal reforming section comprises advantageously oxygen enriched air.

Throughout this specification and the appended claims, the term: "oxygen enriched air" is used to indicate air with a molar oxygen content above 21%, for example comprised between 22% and 80%.

This feature is particularly advantageous for a subsequent urea synthesis, since it allows the achievement—effectively and cheaply—of a $CO_2/NH_3$ stoichiometric ratio and therefore to increase the conversion yield of fed carbon into $CO_2$ and thus urea.

For the implementation of the above process, the present invention provides advantageously a plant for producing synthesis gas comprising:

a primary reforming section and a secondary reforming section arranged in series for obtaining a first gas phase comprising CO, $CO_2$, $H_2$ and possibly $N_2$;

respective means for feeding a first flow comprising hydrocarbons and a first gas flow comprising steam to the primary reforming section;

means for feeding a first gas flow comprising oxygen and possibly nitrogen to the secondary reforming section;

means for feeding the first gas phase comprising CO, $CO_2$, $H_2$ and possibly $N_2$ to a carbon monoxide conversion section;

which is characterized by the fact of comprising:

an autothermal reforming section for obtaining a second gas phase comprising CO, $CO_2$, $H_2$ and possibly $N_2$;

respective means for feeding a second flow comprising hydrocarbons, a second gas flow comprising steam and a second gas flow comprising oxygen and possibly nitrogen to the autothermal reforming section;

means for feeding the second gas phase comprising CO, $CO_2$, $H_2$ and possibly $N_2$ to the carbon monoxide conversion section.

According to a further aspect of the invention, it is provided a method of retrofitting a plant for the production of synthesis gas of the type comprising a primary reforming section and a secondary reforming section arranged in series for obtaining a first gas phase comprising CO, $CO_2$, $H_2$ and possibly $N_2$, respective means for feeding a first flow comprising hydrocarbons and a first gas flow comprising steam to the primary reforming section, means for feeding a first gas flow comprising oxygen and possibly nitrogen to the secondary reforming section, means for feeding the first gas phase comprising CO, $CO_2$, $H_2$ and possibly $N_2$ to a carbon monoxide conversion section, the method comprising the steps of:

providing an autothermal reforming section for obtaining a second gas phase comprising CO, $CO_2$, $H_2$ and possibly $N_2$;

providing respective means for feeding a second flow comprising hydrocarbons, a second gas flow comprising steam and a second gas flow comprising oxygen and possibly nitrogen to the autothermal reforming section;

providing means for feeding the second gas phase comprising CO, $CO_2$, $H_2$ and possibly $N_2$ to the carbon monoxide conversion section.

Thanks to the aforesaid method of retrofitting it is possible easily to increase remarkably the production capacity of an existing plant for the production of synthesis gas, with low operating and investment costs and with low energy consumption.

The characteristics and advantages of the invention will further result from the following description of an embodiment thereof given by way of non limiting example with reference to the attached drawing.

DETAILED DESCRIPTION OF A PREFERRED EMBODIMENT

Figure 1:
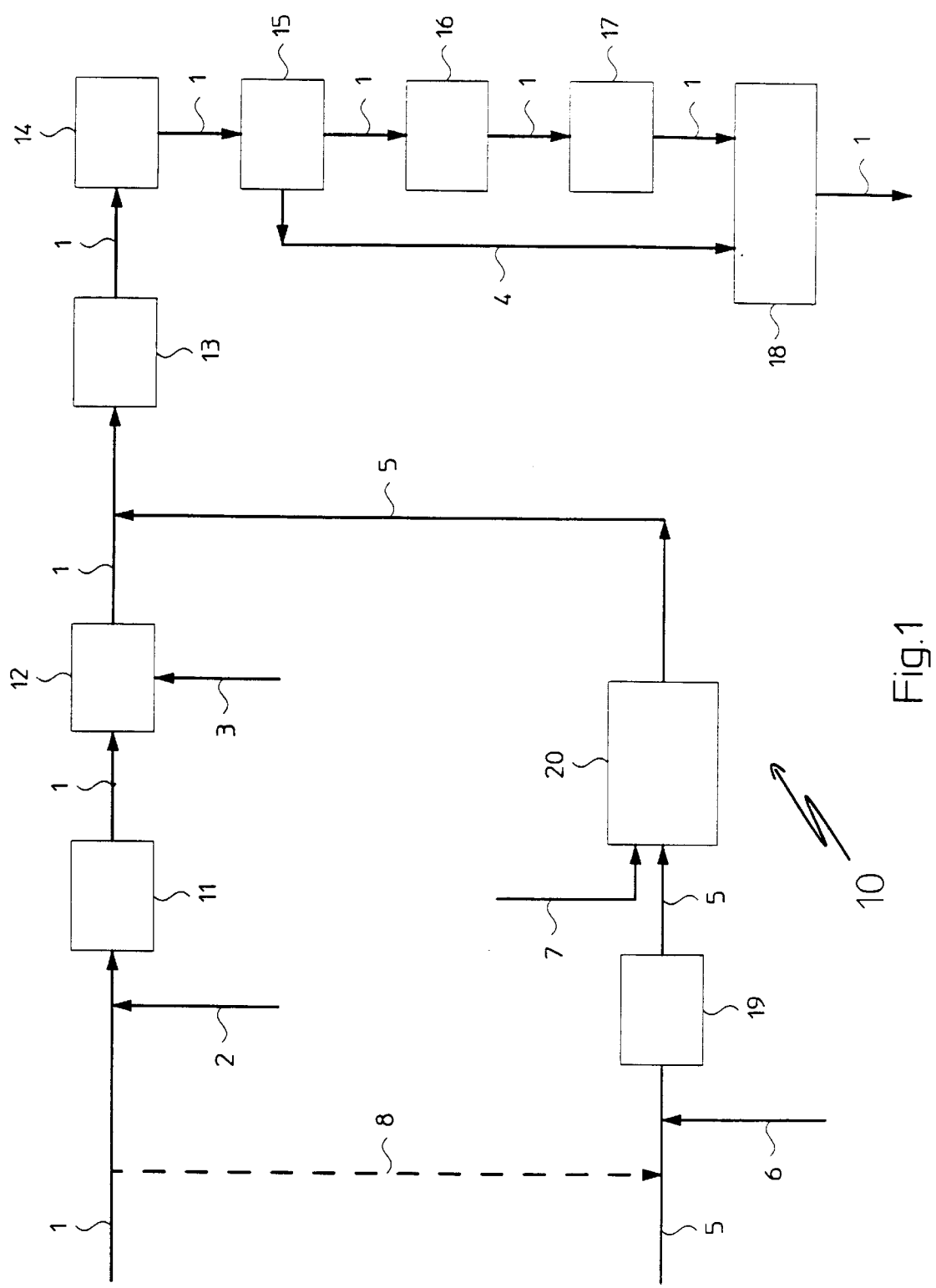
FIG. 1 shows a block diagram of the process for the production of synthesis gas according to the invention, in case ammonia and urea are the wished products.

In FIG. 1, a block diagram is shown that illustrates the process steps according to the present invention for the production of gaseous reactants, such as $H_2$, $N_2$ and $CO_2$ wherein: $H_2$ and $N_2$ are to be used for the synthesis of ammonia, and $CO_2$ is used together with the so produced ammonia for the synthesis of urea.

The present process is however particularly indicated for the production of gaseous reactants not only for the synthesis of ammonia but also for the synthesis of methanol, and for various organic reactions which require $H_2$, CO and possibly $N_2$ and $CO_2$.

With 10 a block diagram is generally indicated which illustrates the process steps for the production of ammonia and urea, and in which the process for the production of synthesis gas according to the invention is included.

In diagram 10, blocks 11–18 respectively indicate: a primary reformer section (block 11), a secondary reformer section (block 12), a CO conversion section, a $CO_2$ separation section (block 15), a purification section for the synthesis gas (block 16), an ammonia synthesis section (block 17) and a urea synthesis section (block 18).

According to the type of synthesis gas to be produced, the CO conversion section can be divided in one or more parts. In the example of FIG. 1, the CO conversion section comprises a CO conversion section at high temperature (block 13) and a CO conversion section at low temperature (block 14).

Blocks 19 and 20 advantageously indicate a (facultative) pre-reforming section (block 19) and an autothermal reforming section (block 20). Blocks 19 and 20 are provided in parallel with respect to blocks 11 and 12.

The autothermal reforming section (block 20) operates with low energy consumption and can include a catalyst bed to facilitate the hydrocarbons reforming reaction.

Blocks 11–18 are crossed by a flow line 1 that represents a flow having a composition which varies with the passage through the different reaction sections.

In particular, at the inlet of the primary reforming section indicated by block 11, the flow line 1 comprises a first flow comprising hydrocarbons and a first gas flow comprising steam fed into the flow line 1 by means of the flow line 2.

Hydrocarbons entering the primary reforming section (block 11) are preferably of gaseous type as for example natural gas.

The flow line 3 indicates a first gas flow comprising oxygen fed into the secondary reforming section (block 12).

Passing through the primary reforming section and the secondary reforming section (blocks 11 and 12) arranged in series, hydrocarbons and steam contained in the feed flow 1—together with oxygen comprised in the flow 3—react, thus obtaining a first gas phase comprising CO, $CO_2$ and $H_2$.

The gas phase leaving the secondary reforming section through the flow line 1, will further comprise a suitable amount of nitrogen ($N_2$) necessary for the following synthesis of ammonia in block 17.

To this end, the gas flow comprising oxygen fed by the flow line 3 into block 12, comprises also nitrogen. Preferably, the flow line 3 represents an air flow.

According to which kind of final synthesis is desired, the flow line 3 can be used for feeding substances of different nature. For example, in the case of methanol synthesis, the flow line 3 feeds only appropriate amount of oxygen to the secondary reforming section.

The carbon monoxide comprised in the gas phase leaving block 12 is thus converted into carbon dioxide through the conversion sections at high and low temperature (blocks 13 and 14), subsequently separated in the $CO_2$ separation section (block 15) and finally fed as reactant for the urea synthesis through flow line 4 into block 18.

From block 15, the gas phase substantially free of CO and $CO_2$, passes through the synthesis gas purification section (block 16) and is then fed—in the form of a gas flow comprising essentially hydrogen and nitrogen—to the ammonia synthesis section indicated with block 17.

The produced ammonia leaving block 17, is then sent always through the flow line 1—to the urea synthesis section (block 18), where it reacts with the carbon dioxide coming from the $CO_2$ separation section (block 15).

Therefore, the flow leaving block 18 (flow line 1) mainly comprises urea.

Advantageously, a second flow line indicated with 5 in FIG. 1 crosses blocks 19 and 20 of diagram 10.

At the inlet to the pre-reforming section (block 19), the flow line 5 comprises a second flow comprising hydrocarbons and a second gas flow comprising steam fed into the flow line 5 by means of the flow line 6.

Hydrocarbons fed to such section may be of the same kind of those fed to the reforming sections indicated with blocks 11 and 12, or of different kind such as for example naphtha.

In particular, thanks to the presence of the pre-reforming section (block 19), it is possible to use advantageously practically any kind of hydrocarbons for the reforming reaction, and to obtain at the same time a reduction of the energy and feed steam consumption.

In this way it is possible to adapt the process for the production of synthesis gas to whichever condition and type of hydrocarbon mixtures available.

Block 19 is anyway to be considered as optional and not necessary, in particular when gaseous hydrocarbons such as natural gas are used for the reforming reaction.

In this respect, it shall be clarified that it is absolutely not necessary to feed all the second flow comprising hydrocarbons and all the second flow comprising steam to the pre-reforming section (block 19). In fact, in some instances, depending upon the working conditions and upon the kind of hydrocarbons available, it can be more advantageous to send only a part of such flows (for example between 20% and 80%) to block 19, and the remaining part directly to the autothermal reforming section (block 20).

Further on, a second gas flow comprising oxygen and in this case also nitrogen, for example air, is sent to the autothermal reforming section (block 20) by means of the flow line 7, analogously to what already described with respect to flow line 3.

Passing through the pre-reforming section and the autothermal reforming section (blocks 19 and 20), the hydrocarbons and the steam contained in feed flow 5 react, obtaining a second gas phase comprising CO, $CO_2$, $H_2$ and $N_2$ which is combined with the first gas phase (flow line 1) immediately upstream of the CO conversion section and together with the it passes through the remaining blocks of the diagram 10, as above described.

In the example shown in FIG. 1, the flow line 5 enters into the flow line 1 upstream of the high temperature conversion section indicated by block 13. Anyway, the possibility is not excluded, even if not represented, of sending at least a portion of the second gas phase coming from the autothermal reforming section (block 20) to a location upstream of the CO conversion section at low temperature, between blocks 13 and 14.

Particularly satisfactory results have been obtained by feeding oxygen enriched air to block 20 through the flow line 7.

In doing so, the amount of $CO_2$ comprised in the second gas phase and therefore which can be fed to the urea synthesis section (block 18) is advantageously increased, thereby improving the conversion yield. Controlling the concentration and the feed rate of the flow comprising oxygen enriched air fed to the autothermal reforming section, it is possible to obtain $CO_2$ in a sufficient amount to convert all the ammonia produced into urea, and this independently from the type of hydrocarbons fed to blocks 1 and 5.

Further on, the use of oxygen enriched air in the present process allows to reduce the amount of inert gases sent to the ammonia synthesis section (block 17) advantageously increasing the conversion yield in such section.

According to an alternative embodiment of the present invention, it is foreseen to divert a part of the flow comprising feed hydrocarbons from the flow line 1 to the flow line 5 to be sent to the autothermal reforming section (block 20), as indicated by the flow line 8 represented with a dashed line.

In this way, whenever the maximum operating capacity of the plant implementing the present process is not required, it is possible to further reduce the overall energy consumption, because the load to the autothermal reforming section (block 20) can be maximized and the external energy supply to the primary reforming section (block 11) can be reduced.

Preferably, the portion of the first flow of hydrocarbons diverted to the flow line 5 is comprised between 5% and 60% on total.

Alternatively, according to a not represented embodiment of the present invention, the flow line 8 departs from the flow line 1 in a location downstream to the inlet into line 1 of flow line 2. In this case, along with a portion of the first flow comprising hydrocarbons also a portion of the first gas flow comprising steam is fed into flow line 5.

Generally speaking, the very high flexibility of the process according to the invention allows to reduce, depending from the flow rates and the amount of synthesis gas to be produced, the load to the primary reforming section with a corresponding advantage in terms of energy consumption.

In this respect, particularly satisfying results have been obtained minimizing the amount of hydrocarbons fed to the primary reforming section and at the same time maximizing the amount of hydrocarbons to be sent to the autothermal reforming section.

The operating conditions of the sections indicated by blocks 11–20, as well as the nature of the chemical reactions occurring therein, are conventional and therefore will not be further described being known to the man skilled in the art.

According to the process for the production of synthesis gas of the present invention, a first flow comprising hydrocarbons and a first gas flow comprising steam are fed (flow line 1 and 2) to a primary reforming section (block 11), while a first gas flow comprising oxygen and possibly nitrogen (flow line 3) is fed to a secondary reforming section (block 12). The hydrocarbons and the steam are reacted in the primary reforming section and then together with oxygen—in the secondary reforming section, obtaining a first gas phase comprising CO, $CO_2$, $H_2$ and possibly $N_2$. The so obtained gas phase is then fed to a carbon monoxide conversion section.

Advantageously, according to the further steps of the present process, a second flow comprising hydrocarbons, a second gas flow comprising steam and a second gas flow comprising oxygen and possibly nitrogen (flow lines 5–7) are fed to an autothermal reforming section (block 20) arranged in parallel with respect to the primary and secondary reforming sections. The hydrocarbons, the steam and the oxygen are reacted in the autothermal reforming section obtaining a second gas phase comprising CO, $CO_2$, $H_2$ and possibly $N_2$ that is in turn sent (flow line 5) to the carbon monoxide conversion section.

According to an alternative embodiment, the process according to the present invention further comprises the step of subjecting at least a part of the second flow comprising hydrocarbons and of the second gas flow comprising steam to a pre-reforming treatment (block 19) before being fed to the autothermal reforming section.

According to a further alternative embodiment, the present process foresees furthermore the step of feeding (flow line 8) a portion of the first flow comprising hydrocarbons to the autothermal reforming section.

The plant for producing synthesis gas according to the present invention comprises the sections indicated by blocks 11–20 of FIG. 1.

Suitable feeding and connecting means are foreseen at the inlet and between the single sections that build up the aforesaid plant, respectively. These means are of known type, such as for example ducts, pipes or alike, schematically represented by the flow lines 1–8 of FIG. 1. Conventional heat exchangers—not represented in FIG. 1—may also be provided in the plant.

A particularly important aspect of the present invention is represented by the retrofitting of pre-existing plants for the production of synthesis gas.

In this respect, the invention provides for a method of retrofitting a plant for the production of synthesis gas of the type comprising a primary reforming section, a secondary reforming section and a carbon monoxide conversion section (blocks 11–14) connected in series, method which advantageously comprises the steps of providing an autothermal reforming section (block 20) in parallel to the existing reforming sections and suitable means for feeding into the autothermal reforming section a second flow comprising hydrocarbons, a second gas flow comprising steam and a second gas flow comprising oxygen and possibly nitrogen, respectively, as well as connecting means between the autothermal reforming section and the carbon monoxide conversion section (flow lines 5–7).

Thanks to the present method of retrofitting, it is possible to increase remarkably the production capacity of an existing plant, for example from 20 to 70%, without overloading the reforming sections and above all maintaining low energy consumption and operating costs if not even reducing them.

Further on, once retrofitted, the plant gains a higher flexibility, being in the condition of suitably operating with whichever type of hydrocarbon and working condition.

In particular, it is possible to apportion the loads between the reforming stages arranged in parallel, in such a way to minimize the primary reforming conversion and accordingly optimize the energy consumption.

It is important to notice that—advantageously—the method of retrofitting according to the invention does not require to enhance or replace the existing reforming sections.

In addition thereto, also the downstream sections for the treatment of the produced synthesis gas are not subjected to particular overloads, requiring—if the case—only marginal and inexpensive interventions. It shall be noticed that, a possible replacement or substantial modification of such sections implies however a much lower cost than the modification of one or even two reforming sections.

According to a preferred embodiment of the present method of retrofitting, the second gas flow comprising oxygen (flow line 7) fed to the autothermal reforming section (block 20) comprises oxygen enriched air. In doing so, it is advantageously possible to increase the amount of $CO_2$ produced, for example until the $CO_2/NH_3$ stoichiometric ratio for urea synthesis is achieved, independently from the type of hydrocarbon being fed.

In order to further reduce the energy consumption, the method of retrofitting according to the present invention advantageously foresees the step of providing means for feeding a portion of the first flow comprising hydrocarbons to the autothermal reforming section (flow line 8).

Alternatively, together with the portion of flow comprising hydrocarbons, also a portion of the gas flow comprising steam is sent to the flow line 5. In this case, the hydrocarbons and the steam to be sent to the autothermal reforming section are preferably taken out already suitably mixed and pre-heated from the flow line 1. In doing so, it is possible to reduce if not even to eliminate the respective apparatuses for mixing and pre-heating the reactants to be sent to the autothermal reforming section, with ensuing energy and investment costs savings.

Finally, according to a further embodiment of the method of retrofitting according to the present invention, the steps of providing a pre-reforming section (block 19), and of providing feeding means of at least a part of the second flow comprising hydrocarbons and of the second gas flow comprising steam to such pre-reforming section and connecting means between the pre-reforming section and the autothermal reforming section (flow line 5), are provided.

In this way, it is possible to use essentially any kind of hydrocarbons as source of carbon and hydrogen to be sent to the autothermal reforming section, without affecting the operation thereof, but, to the opposite, allowing a reduction in the amount of steam to be sent to such section, with ensuing savings in terms of energy consumption and operating costs.

EXAMPLE

In the following example, the advantages resulting from the method of retrofitting according to the present invention are displayed.

In particular, the energy consumption relative to a capacity increase equal to 50% of an existing plant for the production of synthesis gas for obtaining ammonia is discussed.

The results of the instant example have been obtained by means of commercially available calculation algorithms.

The existing plant is of the type shown and described with reference to FIG. 1, blocks 11–17, and was designed to operated at an average production capacity of 1000 MTD of ammonia. The overall energy consumption is normally of 8300 kcal/MT of ammonia.

Natural gas is used as a source of hydrocarbons and the gas flow comprising oxygen fed to the secondary reforming section consists of air.

The primary and secondary reforming sections of the existing plant were not designed for facing a capacity increase equal to 50% but on the contrary, can, at most, stand production peaks that do not override the average value by more than 10–15%.

According to the method of retrofitting of the present invention, the capacity increase of such plant by 50%, for an overall production of 1500 MTD of ammonia, is obtained adding in parallel a suitably dimensioned autothermal reforming section fed with air, steam, naphtha and a portion of the natural gas flow coming from the existing plant (see FIG. 1, reference signs 5–8, 20).

The load is advantageously split in such a way to carry out 60% of the overall production in the existing reforming step (900 MTD) and the remaining 40% in the autothermal reforming section (600 MTD).

Thanks to the present method of retrofitting, it has been surprisingly noticed that—notwithstanding a capacity increase equal to 50%—the overall energy consumption has even decreased of a 2–3% with respect to the existing plant and corresponds to about 8100 kcal/MT of ammonia.

Compared with a retrofitting carried out according to the prior art, which foresees the replacement of the existing primary and secondary reforming sections with new reforming sections having a capacity increased by 50%, the method of retrofitting according to the present invention is extremely advantageous both for the lower energy consumption and—especially—for the lower investment costs.

Finally, it's worth stressing that in order to implement the present method, the same does not require long shutdown times of the existing plant, in view of the fact that the autothermal reforming section is erected in parallel to the existing sections. In this way, the existing plant may operate until the connection between the additional section and the carbon monoxide conversion section is realized.

On the contrary, according to the prior art the plant must be shut down for a longer period in order to permit the retrofitting or the replacement of the reforming sections, with ensuing relevant production losses.

From what above disclosed, the numerous advantages achieved by the present invention clearly arise; in particular it is possible to obtain an extremely flexible process for the production of synthesis gas, easy to implement and which allows to achieve high production capacities with low operating and investment costs and low energy consumption.

What is claimed is:

1. A process for the production of synthesis gas, comprising the steps of:

feeding a first flow comprising hydrocarbons and a first gas flow comprising steam to a primary reforming section;

feeding a first gas flow comprising oxygen to a secondary reforming section;

reacting said hydrocarbons and said steam first in the primary reforming section and then—together with said oxygen—in the secondary reforming section, obtaining a first gas phase comprising CO, $CO_2$ and $H_2$;

characterized in that it further comprises the steps of:

feeding a second flow comprising hydrocarbons, a second gas flow comprising steam and a second gas flow comprising oxygen to an autothermal reforming section arranged in parallel with respect to said primary and secondary reforming sections;

reacting said hydrocarbons, said steam and said oxygen in said autothermal reforming section, obtaining a second gas phase comprising CO, $CO_2$ and $H_2$;

combining said second gas phase comprising CO, $CO_2$ and $H_2$ with said first gas phase comprising CO, $CO_2$ and $H_2$.

2. Process according to claim 1, characterized in that said second gas flow comprising oxygen comprises oxygen enriched air.

3. Process according to claim 1, characterized in that it further comprises the step of subjecting at least a part of said second gas flow comprising hydrocarbons and said second gas flow comprising steam to a pre-reforming treatment before being fed to said autothermal reforming section.

4. Process according to claim 1, characterized in that it further comprises the step of feeding a portion of said first flow comprising hydrocarbons to said autothermal reforming section.

5. Process according to claim 1, wherein said first gas flow comprising oxygen and/or said second gas flow comprising oxygen also comprise(s) nitrogen.

* * * * *